(12) United States Patent
Huang et al.

(10) Patent No.: US 9,515,345 B2
(45) Date of Patent: Dec. 6, 2016

(54) ELECTRICITY-STORAGE BATTERY

(71) Applicant: NISSIN ELECTRIC CO., LTD., Kyoto (JP)

(72) Inventors: Lan Huang, Kyoto (JP); Hiroshige Deguchi, Kyoto (JP); Shosuke Yamanouchi, Kyoto (JP)

(73) Assignee: NISSIN ELECTRIC CO., LTD., Kyoto (JP)

( * ) Notice: Subject to any disclaimer, the term of this patent is extended or adjusted under 35 U.S.C. 154(b) by 0 days.

(21) Appl. No.: 14/443,656

(22) PCT Filed: Dec. 25, 2012

(86) PCT No.: PCT/JP2012/083453
§ 371 (c)(1),
(2) Date: May 19, 2015

(87) PCT Pub. No.: WO2014/102898
PCT Pub. Date: Jul. 3, 2014

(65) Prior Publication Data
US 2015/0295265 A1    Oct. 15, 2015

(51) Int. Cl.
*H01M 8/20*   (2006.01)
*H01M 8/18*   (2006.01)

(52) U.S. Cl.
CPC ............... *H01M 8/188* (2013.01); *H01M 8/20* (2013.01); *Y02E 60/528* (2013.01)

(58) Field of Classification Search
None
See application file for complete search history.

(56) References Cited

U.S. PATENT DOCUMENTS

| 4,362,791 A | * | 12/1982 | Kaneko | ............... H01M 8/184 429/101 |
| 2001/0028977 A1 | * | 10/2001 | Kazacos | ............. B60L 11/1879 429/105 |

FOREIGN PATENT DOCUMENTS

| JP | S57-9073 | 1/1982 |
| JP | S62-15770 | 1/1987 |
| WO | 2012-117543 | 9/2012 |

OTHER PUBLICATIONS

"International Search Report (Form PCT/ISA/210)", mailed on Feb. 26, 2013, with English translation thereof, pp. 1-2.

(Continued)

*Primary Examiner* — Patrick Ryan
*Assistant Examiner* — Haixia Zhang
(74) *Attorney, Agent, or Firm* — Jianq Chyun IP Office

(57) ABSTRACT

An electricity storage battery is described, including a cathode electrolyte solution that contains a manganese redox material and an amine represented by a general formula (1) below:

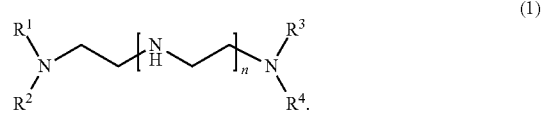

In the general formula (1), n is one of the integers 0 to 4, and each of $R^1$, $R^2$, $R^3$ and $R^4$ independently represents hydrogen, methyl or ethyl, with the proviso that at least one of $R^1$, $R^2$, $R^3$ and $R^4$ is methyl when n is 0.

7 Claims, 2 Drawing Sheets

(56) References Cited

OTHER PUBLICATIONS

Takashi Shirakashi, "Study of Equilibrium and Rate on Ethylenediaminetetraacetatomanganate(III) Complex," Abstract of PhD dissertation for Graduate School of Science (doctoral course), Tohoku University (degree conferred on Mar. 25, 1969), Japan.
"Office Action of China Counterpart Application" with machine English translation, issued on Jun. 28, 2016, p. 1-p. 13.

* cited by examiner

ELECTRICITY-STORAGE BATTERY

CROSS-REFERENCE TO RELATED APPLICATION

This application is a 371 application of an international PCT application serial no. PCT/JP2012/083453, filed on Dec. 25, 2012. The entirety of the above-mentioned patent application is hereby incorporated by reference herein and made a part of this specification.

BACKGROUND OF THE INVENTION

Field of the Invention

The invention relates to an electricity storage battery, such as a redox flow battery.

Description of the Related Art

In the prior art, an electrolyte solution for use in an electricity storage battery is known to contain a metal redox material and a chelating agent (refer to Patent Document 1 and Non-Patent Document 1). Patent Document 1 discloses a cathode electrolyte solution containing a Mn redox material and a complexing agent or a chelating agent. Examples of the complexing or chelating agent described in Patent Document 1 are an aminopolycarboxylic acid, a carboxylic acid, an amino acid, an oxyacid, a polyalcohol, a β-diketone, an amine and a polyphosphoric acid. Patent Document 1 also discloses, in the columns of the examples, a cathode electrolyte solution that contains a manganese redox material and a chelating agent being pyrophosphoric acid, an ethylenediaminetetraacetate (EDTA) salt or a hydroxyethylenediaminetriacetate salt. Non-Patent Document 1 describes that a Mn(III)-EDTA complex (ethylenediaminetetraacetatomanganate(III) complex) may self-decompose with generation of $CO_2$ gas.

PRIOR-ART DOCUMENTS

Patent Document

Patent Document 1: Japanese Patent Application Publication No. Sho 57-9073.

Non-Patent Document

Non-Patent Document 1: Takashi Shirakashi, "Study of Equilibrium and Rate on Ethylenediaminetetraacetatomanganate(III) Complex," Abstract of PhD dissertation for Graduate School of Science (doctoral course), Tohoku University (degree conferred on Mar. 25, 1969).

SUMMARY OF THE INVENTION

Problems to be Solved by the Invention

In general, an electricity storage battery utilizes a strongly acidic electrolyte solution. Because a metal redox ion is dissolved in a strongly acidic electrolyte solution stably even in a relatively higher concentration, the energy density of the battery can be raised. Moreover, in a strongly acidic electrolyte solution, the carrier of the ionic conduction is $H^+$ ion or $OH^-$ ion. Since any of the mobility of $H^+$ ion and the mobility of $OH^-$ ion is relatively higher, the conductivity of the electrolyte solution is higher. Thereby, the resistance of the battery is lowered so that the efficiency of the battery is increased. In a case where such a strongly acidic electrolyte solution is used, the material constituting the redox flow battery is required to have a chemical resistance capable of resisting the electrolyte solution. Regarding this, for example, when an electrolyte solution of pH≥3 is used, the chemical resistance required by the material constituting the battery is lower so that the manufacture cost can be reduced. However, in such a case, the metal redox ion is difficult to dissolve stably. The drawback that the solubility of the metal redox ion becomes low in an electrolyte solution of pH≥3 may be compensated for by containing a chelating agent in the electrolyte solution to form a complex with the metal redox ion. However, regarding the electricity storage battery using a chelating agent, there has not been a report for its practical use so far.

Now, a manganese redox material is advantageously utilized as a redox material used in a cathode electrolyte solution of an electricity storage battery, as being relatively cheaper and having a high redox potential. Patent Document 1 describes a principle that separation of a manganese redox material is inhibited in a cathode electrolyte solution containing a manganese redox material and a chelating agent. However, as described in Non-Patent Document 1, the Mn(III)-EDTA complex may self-decompose with generation of $CO_2$ gas, so the intrinsic battery performance of the manganese redox material is difficult to develop.

The invention is made in light of the above facts, and has an object of providing an electricity storage battery in which a manganese redox material can be easily used in the electrolyte solution even when the pH of the electrolyte solution is 3 or more.

Means for Solving the Problems

In order to achieve the above object, an aspect of the invention is to provide an electricity storage battery that includes a cathode electrolyte solution containing a manganese redox material and an amine represented by a general formula (1):

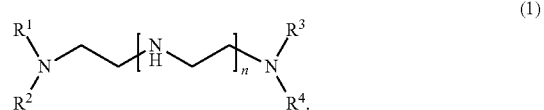

In the general formula (1), n is one of the integers 0 to 4, and each of $R^1$, $R^2$, $R^3$ and $R^4$ independently represents hydrogen, methyl or ethyl, with the proviso that at least one of $R^1$, $R^2$, $R^3$ and $R^4$ is methyl or ethyl when n is 0.

In the above electricity storage battery, the amine preferably contains at least one selected from diethylenetriamine, triethylenetetramine and N,N'-dimethylethylenediamine.

In the above electricity storage battery, the molar ratio of the amine to the manganese redox material in the cathode electrolyte solution is preferably in the range of 1 to 5.

In the above electricity storage battery, it is preferred that the cathode electrolyte solution has been arranged to contain the manganese redox material by dissolving manganese sulfate in water.

In the above electricity storage battery, the content of the manganese redox material in the cathode electrolyte solution is preferably in the range of 0.2 mol/L to 1.0 mol/L.

In the above electricity storage battery, the pH of the cathode electrolyte solution is preferably in the range of 3 to 7.

In the above electricity storage battery, it is preferred that the cathode electrolyte solution has been prepared by causing an electrolytic oxidation reaction to the manganese redox material in presence of the amine.

DESCRIPTION OF THE EMBODIMENTS

A redox flow battery as an electricity storage battery according to an embodiment of the invention will be described below.

[Structure of Redox Flow Battery]

Figure 1:
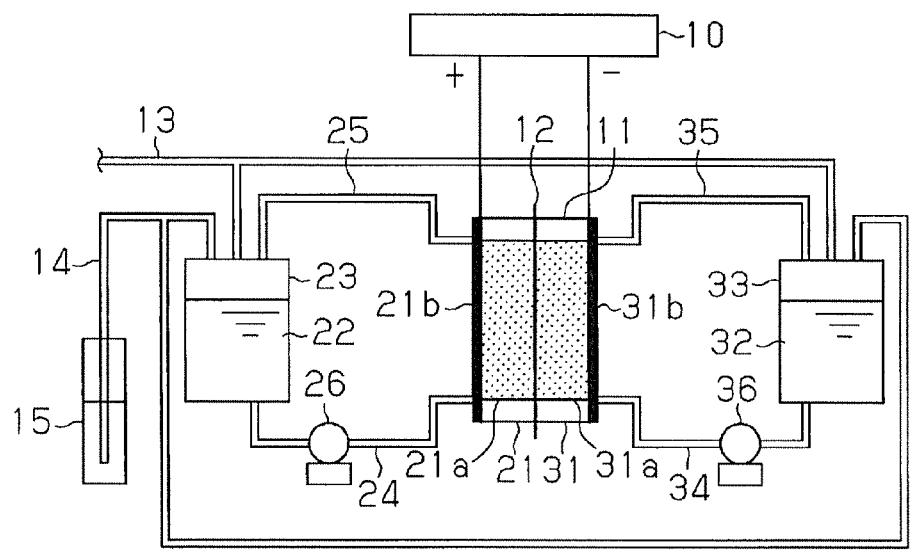
FIG. 1 schematically illustrates a redox flow battery according to an embodiment of the invention.

As shown in FIG. 1, the redox flow battery includes a charge/discharge cell 11. Inside the charge/discharge cell 11 is divided into a cathode cell 21 and an anode cell 31 by a diaphragm 12. The redox flow battery has a cathode electrolyte tank 23 storing the cathode electrolyte solution 22 used in the cathode cell 21, and an anode electrolyte tank 33 storing the anode electrolyte solution 32 used in the anode cell 31. In the redox flow battery, if required, a temperature regulator regulating the peripheral temperature of the charge/discharge cell 11 may be disposed.

The cathode cell 21 is configured such that the cathode 21a contacts with a cathode collector plate 21b. The anode cell 31 is configured such that the anode 31a contacts with an anode collector plate 31b. The cathode 21a and the anode 31a may be composed of, e.g., carbon felts. The cathode collector plate 21b and the anode collector plate 31b may be composed of, e.g., glassy carbon plates. The respective collector plates 21b and 31b are electrically connected to a charge/discharge apparatus 10.

The cathode cell 21 is connected to the cathode electrolyte tank 23 via a supply pipe 24 and a recycle pipe 25. The supply pipe 24 is equipped with a pump 26. By the operation of the pump 26, the cathode electrolyte solution 22 in the cathode electrolyte tank 23 is supplied to the cathode cell 21 through the supply pipe 24. Meanwhile, the cathode electrolyte solution 22 in the cathode cell 21 is recycled to the cathode electrolyte tank 23 through the recycle pipe 25. The cathode electrolyte solution 22 is thus circulated between the cathode electrolyte tank 23 and the cathode cell 21.

The anode cell 31 is connected to the anode electrolyte tank 33 via a supply pipe 34 and a recycle pipe 35. The supply pipe 34 is equipped with a pump 36. By the operation of the pump 36, the anode electrolyte solution 32 in the anode electrolyte tank 33 is supplied to the anode cell 31 through the supply pipe 34. Meanwhile, the anode electrolyte solution 32 in the anode cell 31 is recycled to the anode electrolyte tank 33 through the recycle pipe 35. The anode electrolyte solution 32 is thus circulated between the anode electrolyte tank 33 and the anode cell 31.

To the charge/discharge cell 11, the cathode electrolyte tank 23 and the anode electrolyte tank 33, an inert gas supply pipe 13 is connected to supply an inert gas from an inert gas generation apparatus. By supplying the inert gas to the cathode electrolyte tank 23 and the anode electrolyte tank 33 through the inert gas supply pipe 13, contact of the cathode electrolyte solution 22 and the anode electrolyte solution 32 with the oxygen in the atmosphere is inhibited. As the inert gas, for example, nitrogen gas is used. The inert gas supplied to the cathode electrolyte tank 23 and the anode electrolyte tank 33 is exhausted through an exhaust pipe 14. At the exhaust-side tip of the exhaust pipe 14, a water-seal part 15 is disposed to water-seal the opening of the exhaust pipe 14. The water-seal part 15 prevents the atmosphere from flowing backward into the exhaust pipe 14, and maintains a constant pressure in the cathode electrolyte tank 23 and the anode electrolyte tank 33.

During the charging, an oxidation reaction occurs in the cathode electrolyte solution 22 in contact with the cathode 21a, and a reduction reaction occurs in the anode electrolyte solution 32 in contact with the anode 31a. That is, the cathode 21a releases electrons and the anode 31a receives electrons. Meanwhile, the cathode collector plate 21b supplies the electrons released from the cathode 21a to the charge/discharge apparatus 10, and the anode collector plate 31b supplies the electrons received from the charge/discharge apparatus 10 to the anode 31a.

During the discharging, a reduction reaction occurs in the cathode electrolyte solution 22 in contact with the cathode 21a, and an oxidation reaction occurs in the anode electrolyte solution 32 in contact with the anode 31a. That is, the cathode 21a receives electrons and the anode 31a releases electrons. Meanwhile, the cathode collector plate 21b supplies the electrons received from the charge/discharge apparatus 10 to the cathode 21a, and the anode collector plate 31b collects the electrons released from the anode 31a and supplies the same to the charge/discharge apparatus 10.

[Electrolyte Solution]

The redox flow battery includes a cathode electrolyte solution 22 containing a manganese redox material and an amine. Manganese functions as an active material in the cathode electrolyte solution 22. For example, it is supposed that oxidation of Mn(III) to Mn(IV) occurs during the charging and reduction of Mn(IV) to Mn(III) occurs during the discharging.

In view of raising the energy density, the concentration of the manganese redox material (manganese ion) in the cathode electrolyte solution 22 is preferably not less than 0.1 mol/L, more preferably not less than 0.2 mol/L, and even more preferably not less than 0.4 mol/L. In view of inhibiting separation of the manganese redox material, the concentration of the manganese redox material (manganese ion) in the cathode electrolyte solution 22 is preferably not more than 2.5 mol/L, more preferably not more than 1.5 mol/L, even more preferably not more than 1.0 mol/L, and most preferably not more than 0.8 mol/L.

The amine contained in the cathode electrolyte solution 22 is represented by the following general formula (1).

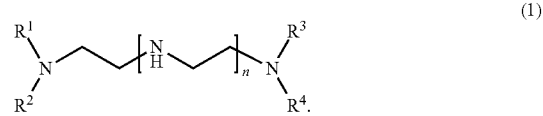

(1)

In the general formula (1), n is one of the integers 0 to 4, and each of $R^1$, $R^2$, $R^3$ and $R^4$ independently represents hydrogen, methyl or ethyl, with the proviso that at least one of $R^1$, $R^2$, $R^3$ and $R^4$ is methyl or ethyl when n is 0.

The amine represented by the general formula (1) is a kind of chelating agent, being capable of forming a complex with the manganese redox material to inhibit separation of the manganese redox material from the cathode electrolyte solution 22.

Examples of the amine represented by the general formula (1) are, e.g., diethylenetriamine (DETA, n=1), triethylenetetramine (TETA, n=2), tetraethylenepentamine (TEPA, n=3), pentaethylenehexamine (PEHA, n=4), tetramethylethylenediamine (TMEDA, n=0), N-methylethylenediamine (n=0), N,N'-dimethylethylenediamine (DMEDA, n=0), N,N-dimethylethylenediamine (n=0), N-ethylethylenediamine (n=0), N,N'-diethylethylenediamine (n=0), and N,N-diethylethylenediamine (n=0).

The cathode electrolyte solution 22 may contain only one kind of amine represented by the general formula (1), or may contain a plurality of kinds of such amine.

The cathode electrolyte solution 22 preferably contains at least one kind of amine selected from diethylenetriamine, triethylenetetramine and N,N'-dimethylethylenediamine.

The molar ratio of the amine represented by the general formula (1) to the manganese redox material in the cathode electrolyte solution 22 is preferably in the range of 1 to 5. When the molar ratio is not less than 1, separation of the manganese redox material is more easily inhibited. When the molar ratio is not more than 5, the reactivity or the charge/discharge cycle characteristic (irreversibility) tends to increase.

The pH of the cathode electrolyte solution 22 is preferably in the range of 3 to 7, and more preferably in the range of 5 to 7. When the pH of the cathode electrolyte solution 22 is not less than 3, the corrosion resistance is easy to maintain. When the pH of the cathode electrolyte solution 22 is not more than 7, separation of the manganese redox material is easy to further inhibit.

If required, the cathode electrolyte solution 22 may also include, e.g., an inorganic acid salt or an organic acid salt, or a chelating agent other than the amine represented by the general formula (1).

The active material used in the anode electrolyte solution 32 is not particularly limited. Examples thereof include an iron redox material, a chromium redox material, a titanium redox material, a copper redox material, and a vanadium redox material.

In view of raising the energy density, the concentration of the metal redox material (metal ion) in the anode electrolyte solution 32 is preferably not less than 0.1 mol/L, more preferably not less than 0.2 mol/L, and even more preferably not less than 0.4 mol/L.

In view of inhibiting separation of the metal redox material, the concentration of the metal redox material (metal ion) in the anode electrolyte solution 32 is preferably not more than 2.5 mol/L, and more preferably not more than 1.5 mol/L.

As the active material used in the anode electrolyte solution 32, for example, a copper redox material is preferred. When containing copper in the anode electrolyte solution 32, it is preferred to dissolve, for example, copper sulfate ($CuSO_4$) in water without containing chloride ion. With respect to the copper in the anode electrolyte solution 32, it is supposed that, for example, reduction of Cu(II) to Cu(I) occurs during the charging and oxidation of Cu(I) to Cu(II) occurs during the discharging.

It is preferred that the anode electrolyte solution 32 further contains a chelating agent. Examples of the chelating agent include, e.g., an amine represented by the general formula (1), ethylenediamine (EDA, n=0), polyethyleneimine, and an aminocarboxylic chelating agent.

The molar ratio of the chelating agent to the metal redox material in the anode electrolyte solution 32 is preferably in the range of 0.5 to 10, and more preferably in the range of 1 to 5.

If required, the anode electrolyte solution 32 may also contain, for example, an inorganic acid salt or an organic acid salt.

The pH of the anode electrolyte solution 32 is preferably in the range of 3 to 11.

The cathode electrolyte solution 22 and the anode electrolyte solution 32 can be prepared with known methods.

When containing the manganese redox material in the cathode electrolyte solution 22, it is preferred to dissolve manganese sulfate ($MnSO_4$) in water, in view of e.g., the availability.

The cathode electrolyte solution 22 is preferably prepared by causing an electrolytic oxidation reaction to the manganese redox material in presence of the amine represented by the general formula (1). For example, by causing an electrolytic oxidation reaction to divalent manganese in an aqueous solution in presence of the amine, a cathode electrolyte solution 22 with a high potential relative to the Ag—AgCl (saturated KCl) electrode can be obtained. When the potential of the cathode electrolyte solution 22 is higher, the voltage obtained by charging and discharging becomes higher. Moreover, while the coulombic amount obtained by multiplying the molar number of the manganese redox material contained in the cathode electrolyte solution 22 with the Faraday constant is defined as 100%, the electrolytic oxidation reaction is preferably conducted in a coulombic amount not less than 100%.

The water used for the cathode electrolyte solution 22 and the anode electrolyte solution 32 is preferably distilled water or water having the same or a higher level of purity. The redox flow battery is preferably charged and discharged while the cathode electrolyte solution 22 and the anode electrolyte solution 32 are under an inert gas atmosphere.

[Function of Redox Flow Battery]

In the cathode electrolyte solution 22 containing the manganese redox material and the amine represented by the general formula (1), the manganese redox material and the amine form a complex so that separation of manganese is inhibited. Moreover, by using the cathode electrolyte solution 22, a good battery performance is developed.

The performance of a redox flow battery can be evaluated according to, for example, the charge/discharge cycle characteristic (irreversibility), coulombic efficiency, voltage efficiency, energy efficiency, electrolyte solution utilization ratio, electromotive force, and potential of electrolyte solution. Hereinafter, one time of charging and discharging of the redox flow battery is called "one cycle."

The charge/discharge cycle characteristic (irreversibility) is calculated by substituting the coulombic amount (A) of the discharging in the $1^{st}$ cycle and the coulombic amount (B) of the discharging in the $90^{th}$ cycle in the following Eq. (1).

$$\text{Charge/discharge cycle characteristic [\%]} = B/A \times 100 \quad (1)$$

The charge/discharge cycle characteristic is preferably 80% or more.

The coulombic efficiency is calculated by substituting the coulombic amount (C) of charging and the coulombic amount (D) of discharging in a given cycle in the following Eq. (2).

$$\text{Coulombic efficiency [\%]} = D/C \times 100 \quad (2)$$

The coulombic efficiency, in terms of the value calculated from the coulombic amounts in the $75^{th}$ cycle, for example, is preferably 80% or more.

The voltage efficiency is calculated by substituting the average terminal voltage (E) of charging and the average terminal voltage (F) of discharging in a given cycle in Eq. (3) below.

$$\text{Voltage efficiency [\%]} = F/E \times 100 \qquad (3)$$

The voltage efficiency, in terms of the value calculated from the terminal voltages in the $75^{th}$ cycle, for example, is preferably 60% or more.

The energy efficiency is calculated by substituting the electricity amount (G) of charging and the electricity amount (H) of discharging in a given cycle in the following Eq. (4).

$$\text{Energy efficiency [\%]} = H/G \times 100 \qquad (4)$$

The energy efficiency, in terms of the value calculated from the electricity amounts in the $75^{th}$ cycle, is preferably 60% or more.

The electrolyte solution utilization ratio is calculated by multiplying the molar number of the active material in the electrolyte solution supplied from the side of the cathode 21a or the anode 31a with the Faraday constant (96500 coulombs/mol) to obtain a coulombic amount (I), obtaining the coulombic amount (J) of the charging in the first cycle, and then substituting the coulombic amount (I) and the coulombic amount (J) in the following Eq. (5). Moreover, in a case where the molar number of the active material in the electrolyte solution supplied from the side of the cathode 21a is different from the molar number of the active material in the electrolyte solution supplied from the side of the anode 31, the smaller molar number is adopted. The electrolyte solution utilization ratio after the $1^{st}$ cycle can also be obtained in the same way.

$$\text{Electrolyte solution utilization ratio [\%]} = J/I \times 100 \qquad (5)$$

The electrolyte solution utilization ratio, in terms of the value calculated from the coulombic amounts in the $1^{st}$ cycle, is preferably 40% or more.

The electromotive force is the terminal voltage at the switching from charging to discharging (when the current is 0 mA) in a given cycle.

The electromotive force, in terms of the terminal voltage in the $1^{st}$ cycle, is preferably 1.0 V or more.

The potential of the electrolyte solution is shown as the potential of a graphite electrode relative to the Ag—AgCl electrode (saturated KCl) in the charging/discharging after the graphite electrode and the Ag—AgCl electrode are inserted in the cathode electrolyte tank 23.

With the embodiment described above, the following effects are made.

First, the redox flow battery of this embodiment includes the cathode electrolyte solution 22 that contains the manganese redox material and the amine represented by the general formula (1). In such cases, even if the pH of the cathode electrolyte solution 22 is 3 or more, separation of the manganese redox material is still inhibited. Hence, the manganese redox material still can be used easily even if the pH of the electrolyte solution is 3 or more.

Second, it is preferred that the cathode electrolyte solution 22 contains at least one kind of amine selected from diethylenetriamine, triethylenetetramine and N,N'-dimethylethylenediamine. In such cases, self-discharging is easy to inhibit, so that the redox flow battery is more highly suitable for practical use. Though the mechanism thereof is not clear, it is supposed that the above amine forms a more stable complex with the manganese redox material as being a relatively lower molecule and having one or more secondary amine structure represented by "C—NH—C" in the molecule.

Third, the molar ratio of the amine represented by the general formula (1) to the manganese redox material in the cathode electrolyte solution 22 is preferably in the range of 1 to 5. In such cases, separation of the manganese redox material is easier to inhibit.

Fourth, it is preferred that the cathode electrolyte solution 22 has been arranged to contain the manganese redox material by dissolving manganese sulfate in water. In such cases, the cathode electrolyte solution 22 can be easily obtained because manganese sulfate is highly available. For example, as compared to a case using manganese chloride, mixing-in of chloride ion as a key factor of chlorine gas generation at the cathode can be easily inhibited.

Fifth, the content of the manganese redox material in the cathode electrolyte solution 22 is in the range of 0.2 mol/L to 1.0 mol/L, so that the energy density is increased and separation of the manganese redox material is easy to inhibit.

Sixth, the pH of the cathode electrolyte solution 22 is preferably in the range of 3 to 7, so that the corrosion resistance is easy to maintain and separation of the manganese redox material is easy to inhibit.

Seventh, it is preferred that the cathode electrolyte solution 22 has been prepared by causing an electrolytic oxidation reaction to the manganese redox material in presence of the amine represented by the general formula (1). In such cases, it is possible to raise the obtained voltage.

Modified Embodiments

The above embodiment may be subject to the following modifications.

The shape, arrangement and number of the charge/discharge cell 11 included in the redox flow battery or the volumes of the cathode electrolyte tank 23 and anode electrolyte tank 33 may be changed according to the performance and so on that are required by the redox flow battery. Moreover, the amounts of the cathode electrolyte solution 22 and the anode electrolyte solution 32 supplied to the charge/discharge cell 11 may also be set according to, for example, the volume of the charge/discharge cell 11 and so on.

An electricity storage battery other than a redox flow battery is also possible.

EXAMPLES

The invention will be described in details with Examples and Comparative Example.

[Solubility Test of Mn(II)-Amine Complex]

In 10 mL of distilled water was dissolved 0.014 mol (2.04 g) of triethylenetetramine (TETA). Dilute sulfuric acid of 2.5 mol/L was added to the aqueous solution to adjust the pH to 6. After 0.014 mol (2.36 g) of $MnSO_4 \cdot H_2O$ was dissolved in the aqueous solution, distilled water was added such that the total amount became 20 mL. Thereby, an aqueous solution of the Mn(II)-TETA complex having a pH of 6 was prepared.

The obtained aqueous solution is placed still at room temperature (~25° C.) and under air for 10 days to perform a solubility test. As a result, no precipitate was identified therein.

In the same manner, aqueous solutions different in the concentration of the Mn(II)-TETA complex or in the pH were prepared, and the solubility test was conducted on them. The result thereof is shown in FIG. 2.

The plot A1 corresponds to the aqueous solutions in which no precipitate was identified in the solubility test. The plot A2 corresponds to the aqueous solutions in which precipitates were identified in the solubility test.

Figure 2:
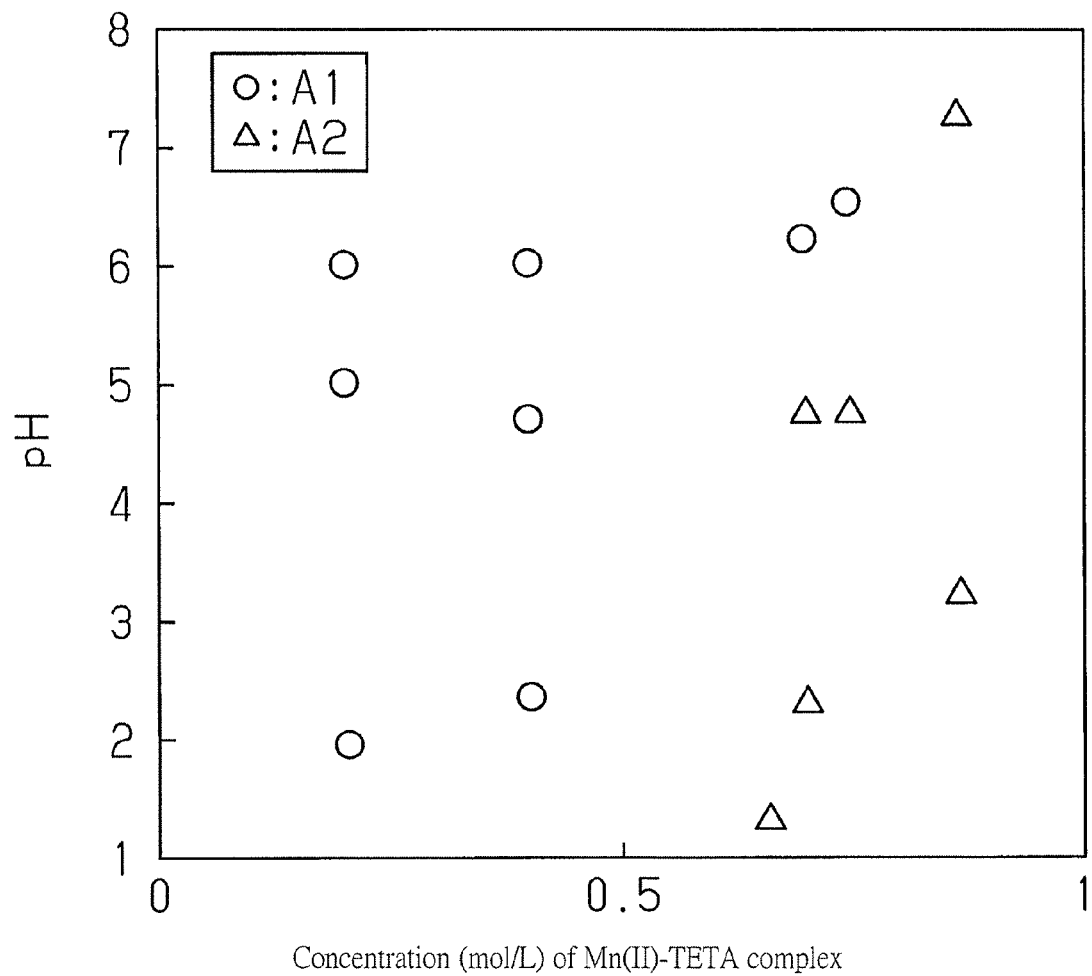
FIG. 2 is a graph showing the result of a solubility test of a Mn(II)-amine complex.

As shown in FIG. 2, the solubility of the Mn(II)-TETA complex was maintained even when the pH of the aqueous solution was 3 or more. It is therefore understood that the value of being utilized as an electrolyte solution of a redox flow battery is high.

Though the solubility test was conducted while the molar ratio of TETA to Mn(II) was one, it is considered that the solubility of the Mn(II)-TETA complex still increases even when the molar ratio of TETA to Mn(II) is increased.

Example 1

Redox Flow Battery

Carbon felts (trade name: GFA5, produced by SGL Group) were used as the cathode and the anode, and the electrode area was set to 10 cm². Pure titanium of 0.6 mm thick was used as the cathode collector plate. A glassy carbon plate (trade name: SG Carbon, 0.6 mm thick, made by Showa Denko K. K.) was used as the anode collector plate. A cation-exchange membrane (CMS, produced by ASTOM Corporation) was used as the diaphgram.

Glass containers having a volume of 30 mL were used as the cathode electrolyte tank and the anode electrolyte tank. Silicone tubes were used as the supply pipe, the recycle pipe, the inert gas supply pipe and the exhaust pipe. A micro-tube pump (MP-1000, made by Tokyo Rikakikai Co., Ltd.) was used as the pump. A charge/discharge battery test system (PFX200, made by Kikusui Electronics Corp.) was used as the charge/discharge apparatus.

<Preparation of Aqueous Solution of Mn(II)-TETA Complex>

In 50 mL of distilled water was dissolved 0.02 mol (2.92 g) of triethylenetetramine (TETA). Dilute sulfuric acid of 2.5 mol/L was added to the aqueous solution to adjust the pH to 6. After 0.02 mol (3.38 g) of $MnSO_4 \cdot H_2O$ was dissolved in the aqueous solution, 0.05 mol (7.1 g) of $Na_2SO_4$ was dissolved. Next, dilute sulfuric acid of 2.5 mol/L was added to the aqueous solution to adjust the pH to 5, and distilled water was added such that the total amount became 100 mL. Thereby, an aqueous solution of the Mn(II)-TETA complex having a concentration of 0.2 mol/L was obtained.

<Preparation of Aqueous Solution of Zn(II)-TETA Complex>

In 50 mL of distilled water was dissolved 0.04 mol (5.84 g) of triethylenetetramine (TETA). After 0.02 mol (5.75 g) of $ZnSO_4 \cdot 7H_2O$ was dissolved in the aqueous solution, 0.05 mol (7.1 g) of $Na_2SO_4$ was dissolved. Next, dilute sulfuric acid of 2.5 mol/L was added to the aqueous solution to adjust the pH to 6, and distilled water was added such that the total amount became 100 mL. Thereby, an aqueous solution of the Zn(II)-TETA complex having a concentration of 0.2 mol/L was obtained.

<Electrolytic Oxidation of Aqueous Solution of Mn(II)-TETA Complex>

The above redox flow battery was used to perform electrolytic oxidation on the aqueous solution of the Mn(II)-TETA complex to prepare a cathode electrolyte solution. At first, 20 mL of the aqueous solution of the Mn(II)-TETA complex was loaded in the cathode electrolyte tank, and 20 mL of the aqueous solution of Zn(II)-TETA complex was loaded in the anode electrolyte tank. Next, the redox flow battery was charged in a constant current of 100 mA for 60 min (386 coulombs in total). Moreover, nitrogen gas was supplied from the inert gas supply pipe before and during the charging.

Thus, the Mn(II)-TETA complex contained in the aqueous solution loaded in the cathode electrolyte tank was electrolytically oxidized to prepare an aqueous solution of Mn(III)-TETA complex having a concentration of 0.2 mol/L that would serve as a cathode electrolyte solution. Moreover, "Mn(III)" is described herein because it is considered that trivalent manganese ion was formed due to the electrolytic oxidation of divalent manganese ion, but the detail about the valence number is unclear.

<Charge/Discharge Test>

The aqueous solution of the Mn(III)-TETA complex obtained with the electrolytic oxidation reaction was used as a cathode electrolyte solution and the aqueous solution of Zn(III)-TETA complex used as an anode electrolyte solution to perform a charge/discharge test. The charge/discharge test began with charging, and the charging was conducted in a constant current of 100 mA for 30 min (180 coulombs in total). Next, discharging was performed in a constant current of 100 mA until a discharging termination voltage 1.0 V was reached. Moreover, $N_2$ gas was supplied from the inert gas supply pipe before and during the charge/discharge test.

The above charging and discharging are taken as one cycle and repeated for 100 cycles.

The redox reactions occurred in the charging/discharging are supposed to be as follows.

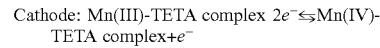

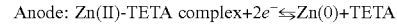

Figure 3:
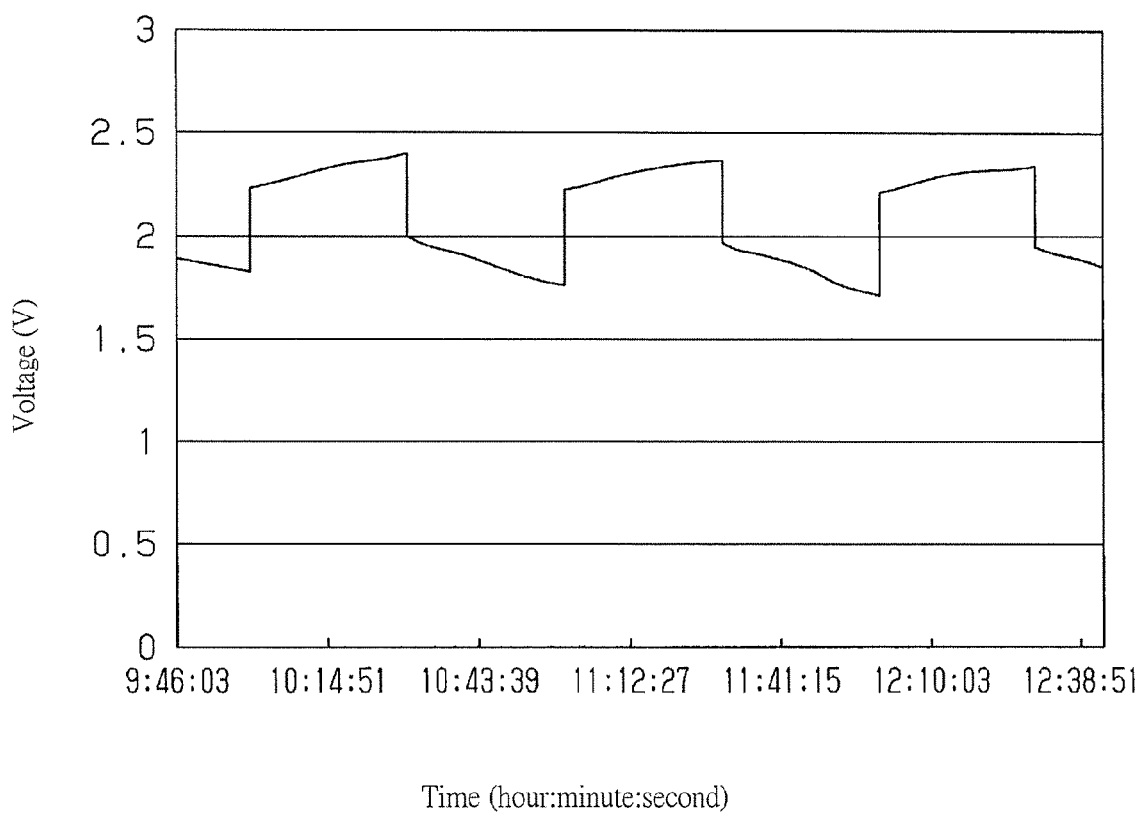
FIG. 3 is a graph showing a relationship of voltage versus time as the result of the charge/discharge test in Example 1.

The transition of the battery voltage from the 75$^{th}$ charge/discharge cycle to the 77$^{th}$ cycle is shown in FIG. 3.

From the charge/discharge test, the charge/discharge cycle characteristic (irreversibility), coulombic efficiency, voltage efficiency, energy efficiency, electrolyte solution utilization ratio, electromotive force, and potential of electrolyte solution were derived.

The charge/discharge cycle characteristic (irreversibility) was derived from the coulombic amount (A) of the discharging in the 1$^{st}$ cycle and the coulombic amount (B) of the discharging in the 90$^{th}$ cycle.

The coulombic efficiency was derived from the coulombic amounts in the 75$^{th}$ cycle.

The voltage efficiency was derived from the average terminal voltages in the 75$^{th}$ cycle.

The energy efficiency was derived from the electricity amounts in the 75$^{th}$ cycle.

The electrolyte solution utilization ratio was derived from the coulombic amounts in the 1$^{st}$ cycle.

The electromotive force was derived from the terminal voltage in the 1$^{st}$ cycle.

The results are shown in the column of the "Result of charge/discharge test" in Table 1.

<Self-Discharge Test>

In the cathode electrolyte tank of the above redox flow battery was loaded 20 mL of the aqueous solution of the Mn(III)-TETA complex obtained with the electrolytic oxidation reaction. In the anode electrolyte tank was loaded 20 mL of an aqueous solution of TETA. Moreover, a graphite electrode and an Ag—AgCl (saturated KCl) electrode had been inserted in the cathode electrolyte tank in advance. Next, charging was conducted in a constant current of 100 mA for 30 min (180 coulombs in total), and the voltage of the graphite electrode relative to the Ag—AgCl electrode after the charging was measured. Next, after the redox flow battery was placed still at room temperature (~25° C.) for about 18 hours, the voltage of the graphite electrode relative to the Ag—AgCl electrode was measured again, and the two voltages were compared.

It is supposed that the charged cathode electrolyte solution after the charging in the above conditions contains the Mn(IV)-TETA complex in a concentration of about 0.1 mol/L.

Moreover, nitrogen gas was supplied from the inert gas supply pipe before and during the self-discharge test.

The result of the self-discharge test is shown in the column of the "Result of self-discharge test" in Table 1.

|  |  | Example 1 |
| --- | --- | --- |
| Result of charge/discharge test |  |  |
| Charge/discharge cycle characteristic (%) |  | 113 |
| Coulombic efficiency (%) |  | 99 |
| Voltage efficiency (%) |  | 81 |
| Energy efficiency (%) |  | 80 |
| Electrolyte solution utilization ratio (%) |  | 46 |
| Electromotive force (V) |  | 2.01 |
| Potential of cathode | End of charging | 1.06 |
| electrolyte solution (V) | End of discharging | 0.94 |
| Result of self-discharge test |  |  |
| Potential of cathode | After charging | 1.0 |
| electrolyte solution (V) | After about 18 hours | 1.0 |

It is clear from the result of the charge/discharge test shown in Table 1 that a good battery performance was obtained in Example 1. It is clear from the result of the self-discharge test shown in Table 1 that self-discharging was sufficiently inhibited in Example 1.

Example 2

In Example 2, an aqueous solution of Mn(II)-DMEDA complex in a concentration of 0.2 mol/L was prepared in the same manner of Example 1 except that TETA was replaced by N,N'-dimethylethylenediamine (DMEDA) in preparing the Mn(II) complex solution. The Mn(II)-DMEDA complex in the obtained aqueous solution was electrolytically oxidized as in Example 1 to prepare an aqueous solution of Mn(III)-DMEDA complex. A self-discharge test was conducted as in Example 1 except that the aqueous solution of Mn(III)-DMEDA complex was used. The result of the self-discharge test of Example 2 was similar to that of Example 1.

Example 3

In Example 3, an aqueous solution of Mn(II)-DETA complex in a concentration of 0.2 mol/L was prepared in the same manner of Example 1 except that TETA was replaced by diethylenetriamine (DETA) in preparing the Mn(II) complex solution. The Mn(II)-DETA complex in the obtained aqueous solution was electrolytically oxidized as in Example 1 to prepare an aqueous solution of Mn(III)-DETA complex. A self-discharge test was conducted as in Example 1 except that the aqueous solution of Mn(III)-DETA complex was used. The result of the self-discharge test of Example 3 is similar to that of Example 1.

Example 4

In Example 4, an aqueous solution of Mn(II)-TMEDA complex in a concentration of 0.2 mol/L was prepared in the same manner of Example 1 except that TETA was replaced by tetramethylethylenediamine (TMEDA) in preparing the Mn(II) complex solution. The Mn(II)-TMEDA complex in the obtained aqueous solution was electrolytically oxidized as in Example 1 to prepare an aqueous solution of Mn(III)-TMEDA complex. A self-discharge test was conducted as in Example 1 except that the aqueous solution of Mn(III)-TMEDA complex was used. The result of the self-discharge test of Example 4 is inferior to that of Example 1.

Example 5

In Example 5, an aqueous solution of Mn(II)-TEPA complex in a concentration of 0.2 mol/L was prepared in the same manner of Example 1 except that TETA was replaced by tetraethylenepentamine (TEPA) in preparing the Mn(II) complex solution. The Mn(II)-TEPA complex in the obtained aqueous solution was electrolytically oxidized as in Example 1 to prepare an aqueous solution of Mn(III)-TEPA complex. A self-discharge test was conducted as in Example 1 except that the aqueous solution of Mn(III)-TEPA complex was used. The result of the self-discharge test of Example 5 is inferior to that of Example 1.

Comparative Example 1

In Comparative Example 1, an aqueous solution of Mn(II)-EDA complex in a concentration of 0.2 mol/L was prepared in the same manner of Example 1 except that TETA was replaced by ethylenediamine (EDA) in preparing the Mn(II) complex solution. As a result, precipitates formed directly. Hence, it is judged that the aqueous solution of Mn(II)-EDA complex is impossible to be used as an electrolyte solution of a redox flow battery.

The invention claimed is:

1. An electricity storage battery, comprising:
a cathode electrolyte solution, containing: a manganese redox material, and an amine represented by a general formula (1):

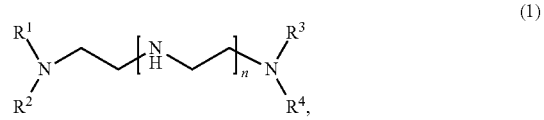

wherein in the general formula (1), n is one of integers 0 to 4, and each of $R^1$, $R^2$, $R^3$ and $R^4$ independently represents hydrogen, methyl or ethyl, with a proviso that at least one of $R^1$, $R^2$, $R^3$ and $R^4$ is methyl when n is 0.

2. The electricity storage battery of claim 1, wherein the amine contains at least one of diethylenetriamine, triethylenetetramine and N,N'-dimethylethylenediamine.

3. The electricity storage battery of claim 1, wherein a molar ratio of the amine to the manganese redox material in the cathode electrolyte solution is in a range of 1 to 5.

4. The electricity storage battery of claim 1, wherein the manganese redox material has been prepared by dissolving manganese sulfate in water.

5. The electricity storage battery of claim 1, wherein a content of the manganese redox material in the cathode electrolyte solution is in a range of 0.2 mol/L to 1.0 mol/L.

6. The electricity storage battery of claim 1, wherein pH of the cathode electrolyte solution is in a range of 3 to 7.

7. The electricity storage battery of claim 1, wherein the manganese redox material in the cathode electrolyte solution has been prepared by an electrolytic oxidation reaction in presence of the amine.

* * * * *